May 3, 1966  W. D. VOELKER  3,249,659
METHOD OF MAKING LAMINATED PANEL STRUCTURES
Filed July 19, 1961  2 Sheets-Sheet 1

INVENTOR.
WALTER D. VOELKER
BY
ATTORNEYS

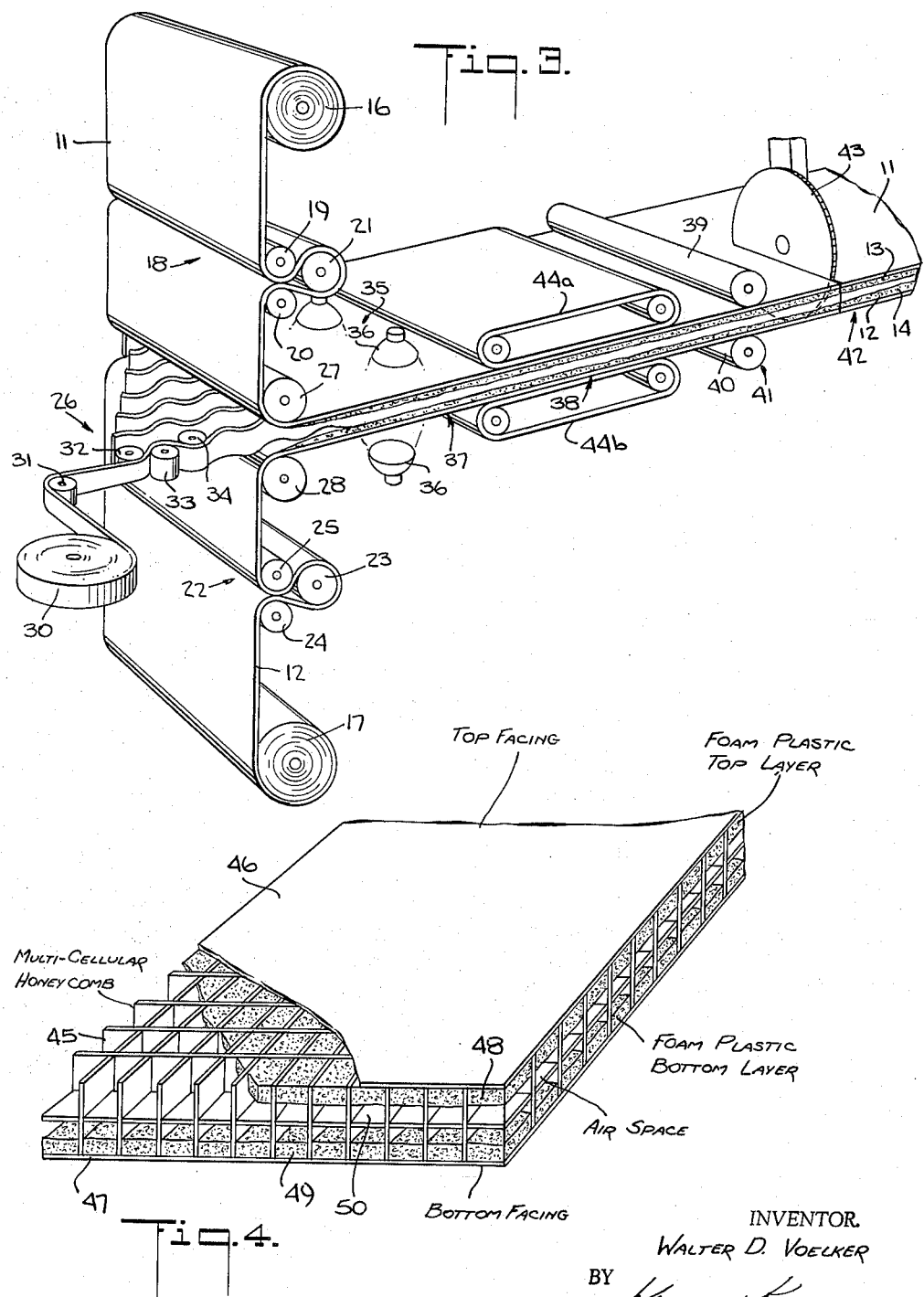

United States Patent Office 3,249,659
Patented May 3, 1966

3,249,659
METHOD OF MAKING LAMINATED PANEL STRUCTURES
Walter D. Voelker, Philadelphia, Pa., assignor, by mesne assignments, to Allied Chemical Corporation, New York, N.Y., a corporation of New York
Filed July 19, 1961, Ser. No. 125,216
1 Claim. (Cl. 264—47)

My invention relates generally to the fabrication of laminated panels and more particularly to sandwich panels constituted by a grid or core interposed between facing sheets and partially filled with a foamed plastic to form an air space therein.

Structural panels are known which are formed by a reinforcing honeycomb or multi-cellular grid faced with skins made of wood or plywood, sheet metal, paper or other sheeting material. Such panels have many uses and are adapted to serve as walls, partitions, doors, truck bodies and the like.

In my co-pending application Serial No. 92,386, filed February 28, 1961, entitled, "Reinforced Sheet Material," there is disclosed a sandwich panel in which the reinforcing core is entirely filled with polyurethane foam. Such panels not only exploit the superior tensile properties of polyurethane foam, but also have the advantage of improved insulating characteristics as well as fire and chemical resistance. However, polyurethane foam is relatively expensive and panels filled therewith are somewhat costly.

Accordingly, it is the principal object of the present invention to provide an improved and less expensive panel structure making use of a foam plastic filler and having an optimum ratio of maximum structural strength and minimum weight.

A further object of the invention is to provide a panel of this type which is of economical and efficient design, and which effects a significant saving in the amount of foam plastic incorporated in the panel.

More specifically, it is an object of the invention to provide a laminated panel in which a reinforcing grid interposed between facing sheets is partially filled with foamed plastic to define a central air space, the relative arrangement of foam and air being such as to secure the most favorable ratio of strength to weight.

Also an object of the invention is to provide a method and apparatus for fabricating sandwich panels of the above described type.

An important feature of the present invention is that the composite structure is exceptionally light and strong and is suitable not only as interior and exterior building members, but also as replacements for wooden boxes or corrugated containers. The panel is not affected by water or fumes, it is chemically inert, and may be made in modular units for purposes of prefabrication. The method for making the panels lends itself to automated large scale production to effect a further reduction in production costs.

Briefly stated, in a method in accordance with the invention, two facing sheets are concurrently advanced through a coating zone in which thin layers of foam forming mixtures are applied to the inner surfaces of the sheets. Transverse reinforcing members are then inserted between the advancing sheets. The resultant combination is heated to accelerate a chemical reaction whereby the two plastic layers foam and expand toward each other but without merging, the plastic layers being separated by a central air space. The plastic layers, when stabilized, adhere both to the facing sheet and the reinforcing members to provide a unitary composite structure having the desired properties.

For a better understanding of the invention, as well as other objects and further features thereof, reference is made to the following detailed description to be read in conjunction with the accompanying drawings, wherein like components are identified by like reference numerals.

In the drawings:

FIG. 3 shows a machine for carrying out the method; and

FIG. 4 is a perspective, partially exposed, view of another preferred embodiment of the composite structure.

Figure 1:
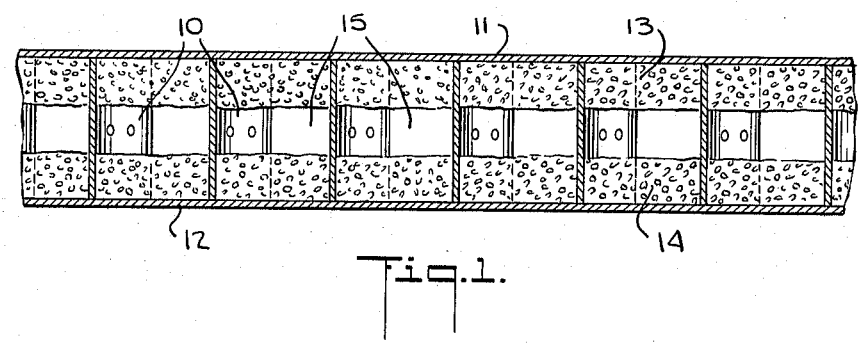
FIG. 1 is a sectional view of one preferred embodiment of a composite structure in accordance with the invention.

Referring now to the drawings and more particularly to FIG. 1, there is illustrated a preferred embodiment of a composite structure comprising transverse rib-like members 10 forming a reinforcing grid or honeycomb, the grid being sandwiched between an upper facing sheet 11 and a lower facing sheet 12. The grid and facing sheet may be made entirely of paper, fiber glass fabric, metal foil, plastic sheeting or of any other suitable material or combination thereof, depending of course on the end use to which the structure is put. The panel, in accordance with the invention, may be used in fabricating radar canopies, airplane and guided missile components and in similar applications requiring both light weight and strength.

Formed on the inner surface of the upper sheet 11 is a layer 13 of foam plastic which adheres both to the sheet and to the sides of the reinforcing ribs extending therethrough. Similarly formed on the inner surface of the lower sheet 12 is a layer 14 of foam plastic. The thickness of the two foam plastic layers is such as to leave a central air space 15 between the two layers, the foam otherwise filling the interstices of the grid.

The reinforcing members 10 may be provided with perforations 16 to permit the free flow of air between the air chamber defined by the members. Although the reinforcing members are transversely disposed relative to the facing skins, their longitudinal paths may be linear, saw-toothed, serpentined or otherwise directed to form a reinforcing grid. Various preferred forms of reinforcing grids are disclosed in detail in my co-pending application above-identified, and it is to be understood that the invention may embody any one of these forms as well as any other known form of honeycomb or core.

It will be seen that the construction of the composite panel is such as to be constituted by a honeycomb sandwich in which the interstices of the honeycomb are partially filled with foam plastic to define an air space which extends in an intermediate plane parallel to the plane of the panel. This construction not only effects a saving in the amount of foam plastic incorporated in the panel and reduces the weight of the panel, but also affords the most favorable ratio of structural strength to weight but in some cases they may be disparate.

A well-established principle of mechanical engineering is that the greatest strength and rigidity in a structural member having a given amount of material is realized by disposing the surfaces subjected to stress so that they are far apart as possible to provide the greatest moment of inertia. Thus, a steel I-beam in which two parallel flanges are held at a distance from each other by a thin connecting web is considerably stronger and stiffer than a square rod of the same cross-sectional area.

It is therefore possible to consider the composite panel as analogous to an I-beam, with the outer facing sheets 11 and 12 and the foam plastic layers thereon corresponding to the flanges and the reinforcing members 10 acting as the connecting web. From this it will be appreciated that the greatest strength and rigidity will result by using relatively broad reinforcing members to attain the greatest separation, thereby disposing the maximum amount of foam plastic material the greatest distance from the neutral axis.

The neutral axis in a beam subjected to a bending action is that line or plane in which the fibers are neither stretched nor compressed or where longitudinal stress is zero. A composite panel may, as pointed out above, be treated as a beam. The neutral axis of a conventional single panel will normally run longitudinally through the center thereof. The position of the neutral axis of a composite panel is normally also through the center when the construction is symmetrical as in the present instance. Thus, if in the composite panel, the available foam plastic material is placed as far as possible from the neutral axis, the greatest possible moment of inertia will be attained. And, since the central plane of the panel does not contribute significantly to its structural strength, it may be left unfilled, thereby effecting an economy in the use of plastic as well as a reduction in weight.

It will be evident from the foregoing that superior strength and rigidity are obtained in a composite panel by so arranging the components with respect to their weights as to obtain maximum spacing between the outer facing sheets and by disposing a maximum amount of foam material the greatest distance from the neutral axis.

A better understanding of the affect of the moment of inertia on the structural characteristics of the panel may be gained by analyzing the inertia values in the light of their influence on the maximum load attained in a column test. Assume that the Euler column strength formula is applicable for a certain set of conditions in which the load is:

$$P = \frac{4\pi 2EI}{l2}$$

where

Figure 2:
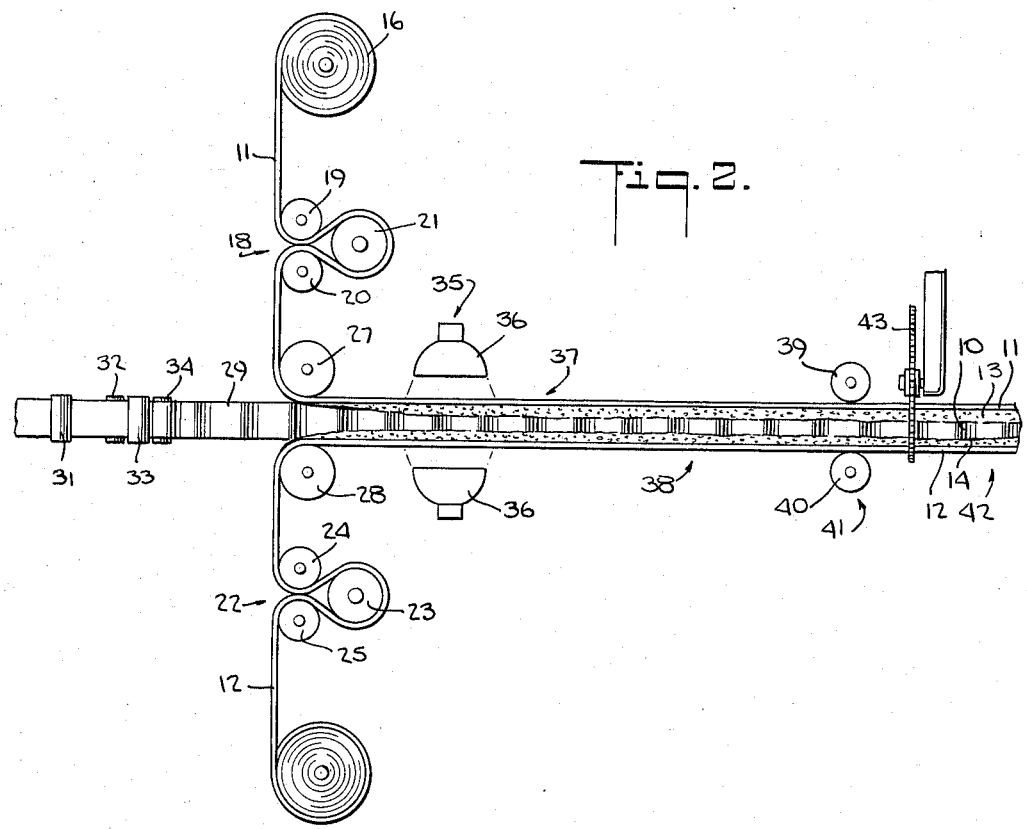
FIG. 2 is a schematic illustration of the method for fabricating the composite structures.

4 = a factor for fixed ends
$E$ = modulus of elasticity for material of the column
$l$ = length of column in inches
$I$ = moment of inertia The method of fabricating the composite panel is illustrated schematically in FIG. 2 where it will be seen that the top and bottom facing sheets 11 and 12 are drawn continuously as webs from supply rolls 16 and 17. The web 11 is advanced through a metering zone 18 constituted by a pair of metering rolls 19 and 20 and an applicator roll 21 which applies a foam forming mixture to one surface of web 11. Similarly, the lower facing web 12 is advanced through a metering zone 22 including an applicator roll 23 which supplies a foam forming mixture to the web, the thickness being controlled by metering rolls 24 and 25.

The foam forming mixture applied to form the plastic foam may consist of any appropriate formulation such as the following rigid polyurethane foam-forming mixture:

| | |
|---|---|
| Polypropylene ether glycol 2000 mol. 25 | 80 |
| Sorbitol | 20 |
| Tolylene diisocyanate | 82 |
| Polyethylene ether glycolpolydimethyisilixane | 1 |
| Triethylenediamine | 1 |
| Water | 3 |

Another typical formulation for the foam forming chemicals is as follows:

| | |
|---|---|
| Sorbitol | 10 |
| Polypropyleneglycol (molecular weight 2000) | 60 |
| Toluene diisocyanate | 28 |
| Triethylene diamine | 0.7 |
| Water | 3.0 |
| Silicone oil | 0.5 |

It is to be understood that while the invention is disclosed herein in connection with urethane foams, other foams may also be successfully used, such as epoxy or phenolic foams.

The coated sheets 11 and 12 advance to a reinforcement insertion zone 26 comprising rolls 27 and 28, directing the coated sheets into their parallel paths at a predetermined spacing corresponding substantially to the predetermined thickness of the composite structure. A plurality of reinforcing members 29 are withdrawn from a supply roll 30 and directed over rolls such as 31, 32, 33 and 34 to impart whatever twist, folding or gluing may be appropriate prior to the entry of the plurality of reinforcing members 29 into the reinforcement zone 26. The edges of the reinforcing members 29 abut the inner surface of the facing sheets 11 and 12 and the resultant combination of the reinforcing members and coated facing sheets advance from the reinforcement insertion zone 26 at a uniform forward speed. Alternatively, the honeycomb may be preformed and wound on a supply reel.

The combination then travels through a heating zone 35 in which infra-red lamps 36 heat the foam-forming mixture sufficiently to accelerate some of the chemical reactions, whereby the foam-forming mixture expands in an expansion zone 37 and the heat-initiated chemical reactions are completed in a stabilizing zone 38 where the polymerization reactions are completed. It is to be understood that heating accelerates the foaming process and is not essential in all cases. The composite structure comprising the facing sheets 11, 12, plastic foam layers 13, 14, air core layer 15 and reinforcing members 10 is advanced by the action of power driven rolls 39, 40 in a pulling zone 41. The composite structure may be cut into planks in a product withdrawal zone 42 comprising a traversing saw 43.

Each thin film of foam-forming chemicals expands to about twenty times the applied thickness. Hence, if the coating on each sheet were to be made about 1/40 of the total thickness of the reinforcing grid, the two foam layers would expand to the point of merger. Therefore, to allow for a substantial air space and to prevent merger, the thickness of each coating is made preferably about 1/60 of the total thickness. In some cases, the initial coating may be as little as 1/200 of the total thickness and in others as much as 1/50 of the total thickness. It will be obvious that the dimensions of the air space may be controlled by varying the thickness of the initial coating.

As disclosed in my co-pending application, above-identified, the sandwich structure may be further reinforced by filaments. Such filaments may be of cotton string, metal wire or other material but particular advantages are achieved by the use of glass fiber, which imparts particular strength to the paper and polyurethane structure. By the use of glass fiber roving, better anchoring of the fiber in the polyurethane foam is achieved. Materials as expensive as glass fiber can be employed in structures as inexpensive as sandwich structures only when they constitute a relatively small percentage by weight of the total structure and only when the bonding of the glass fiber to the sandwich structure is sufficiently strong to justify the additional material cost and processing operations for the inclusion of glass fiber. The glass fiber is so introduced as to position the fiber in the final structure where it will be adjacent the line of contact between a reinforcing member and an internal surface of a sheet of the sandwich. A plurality of glass fibers may thus be positioned at a plurality of the contact lines. If desired, the bonds between the glass fiber and the reinforcing paper and/or facing sheet can be strengthened by the use of special adhesives such as quick setting epoxy cement.

Thus, the two sheets of material 11 and 12 are separately coated with a thin film of foam forming chemicals and passed around rollers into parallel relationship and the coated sheet materials advance while the polyurethane foams expands. If a rigid panel is being prepared, the polyurethane foam core hardens to a rigid structure, losing its plasticity. The strip of sandwich structure formed continuously is cut into panels, which are removed at a sandwich panel withdrawal zone. If a flexible sandwich is being prepared, for use say in sleeping bags, the polymerization of the flexible foam core is substantially completed before the rolling up of the product at the product withdrawal zone.

It will be observed that the reinforcement members are inserted into the sandwich structure subsequent to the coating of the sheet material with foam-forming chemicals but prior to the bonding of the sandwich as a unitary structure. Thus, in the final structure, the reinforcement members are adhered securely to the contiguous portions of the rigid polyurethane foam core and the reinforcement members are also adhered to the faces of the sandwich structure. The polyurethane chemical mixtures are effective as adhesives for bonding the surfaces of the reinforcing members to the internal surfaces of the sheet material. Both the sheet material and reinforcement members are selected to bond readily with urethane materials.

Referring now to FIG. 3, the machine for carrying out the method disclosed in FIG. 2 to produce the composite structure comprises power driven rolls 39 and 40 which act upon the stabilized composite structure to advance it toward the product withdrawal zone 42. The pulling action of the power-driven rolls in pulling zone 41 acts to draw the facing sheets and the reinforcing strips from their respective supply rolls to the withdrawal zone, the supply rolls being undriven. In some cases however where the supply rolls are relatively massive, it may be desirable in order to prevent excessive drag on the webs or possible rupture thereof to also drive the supply rolls through a mechanical or hydraulic means as to provide only a slight drag on the forward motion.

Supply roll 16 supplies a web of sheet material 11 which travels through coating zone 18 including the metering rolls 19 and 20 and the applicator roll 21 which is supplied with a foam-forming mixture at the required rate. Similarly, supply roll 17 provides a web of sheet material 12 which is advanced through metering zone 22 constituted by metering rolls 24 and 25 and applicator roll 23. It is to be understood that the invention is not limited to this specific means of coating the sheets and any known technique, such as the rotogravure process or spraying may be used for this purpose to provide a coating having the desired thickness. It is again noted that the thickness must be calculated to provide a stabilized foam layer on each sheet which falls short of the central plane of the composite structure to define the desired air space.

The sheets so coated are advanced toward the reinforcement insertion zone 26 from which the sheets emerge in parallel relationship in combination with a plurality of reinforcing ribs or strip members 10 drawn from individual supply rolls 30 and corrugating rolls 31 to 34 which impart the desired twist, fold or corrugation to the ribs.

The coated sheets having the ribs interposed therebetween then enter the heating zone 35 where heat lamps 36 irradiate the sheets to accelerate the chemical reaction in the foam-forming mixture for expansion of the coating into a plastic foam. From the heating zone, the combination advances through a foam expansion zone 38 in which the combination is maintained at a predetermined thickness by suitable pressure belts 44a and 44b or by other means such as slide platens. The stabilized product can be sawed into planks or any other shape by the saw 43.

In the embodiment shown in FIG. 4, the composite structure is constituted by a multi-cellular honeycomb 45 composed of cubicles, the honeycomb being covered by a top facing sheet 46 and a bottom facing sheet 47 to which are applied foam plastic layers 48 and 49, in the manner described above, to define a central air space 50. The honeycomb may be pre-formed or molded and may be of any suitable material to which the plastic foam will adhere, such as pulp, balsa, paper, etc. The facing may for example be of metal or plywood. In the event the surface material of the composite structure is rigid, as in the case of plywood, the foam-forming chemicals may be applied as by spraying, roller coating or by other known techniques.

While there have been disclosed preferred embodiments of the invention it will be obvious that many changes and modifications may be made without departing from the essential spirit of the invention. It is intended therefore in the accompanying claims to cover all such changes and modifications as fall within the true spirit of the invention.

I claim:

A method of fabricating a rigid composite panel structure which method comprises the steps of: (A) applying a liquid polyurethane foam-forming chemical mixture onto one surface of each of two advancing sheets of facing materials; (B) advancing the said facing sheets through metering rolls whereby the thickness of the liquid foam-forming mixture on the facing sheets is precisely controlled; (C) advancing the facing sheets along parallel spaced paths in which the liquid foam-forming mixture coated surfaces face each other and inserting transverse reinforcing ribs between the two coated advancing sheets prior to substantial generation of a rising foam layer from the foam-forming mixture, said reinforcing ribs having opposing lateral edges which are pressed on insertion into bonding contact with the liquid foam-forming mixture coated surfaces of said two facing sheets to form a sandwich comprising said two liquid coated sheets and a grid of said reinforcing ribs; (D) advancing said sandwich through a heating zone and therein applying heat thereto to promote the expansion of the foam-forming mixture and generate a plastic foam layer on each said facing sheet; (E) passing said sandwich with expanding polyurethane foam-forming layers through a stabilization zone and therein applying pressure to said sandwich to maintain the desired thickness of the sandwich panel; and (F) recovering a rigid sandwich panel in which each foam layer is bonded to a facing sheet and to the ribs with the foam layers defining an air space within said sandwich panel.

References Cited by the Examiner

UNITED STATES PATENTS

| 2,866,730 | 12/1958 | Potchen et al. | 156—78 XR |
| 2,983,636 | 5/1961 | Runton | 156—500 |
| 2,993,871 | 7/1961 | Shannon et al. | 161—161 |

FOREIGN PATENTS

| 723,621 | 2/1955 | Great Britain. |

ALEXANDER WYMAN, *Primary Examiner.*

CARL F. KRAFFT, EARL M. BERGERT, *Examiners.*

M. E. ROGERS, W. J. VAN BALEN,
*Assistant Examiners.*